(12) United States Patent
Gauria et al.

(10) Patent No.: US 10,310,768 B1
(45) Date of Patent: Jun. 4, 2019

(54) CONVOLUTION CALCULATIONS IN MULTIPLE DIMENSIONS

(71) Applicant: Ambarella, Inc., Santa Clara, CA (US)

(72) Inventors: Sameer M. Gauria, Ithaca, NY (US); Peter Verplaetse, Redwood City, CA (US)

(73) Assignee: Ambarella, Inc., Santa Clara, CA (US)

( * ) Notice: Subject to any disclaimer, the term of this patent is extended or adjusted under 35 U.S.C. 154(b) by 135 days.

(21) Appl. No.: 15/403,540

(22) Filed: Jan. 11, 2017

(51) Int. Cl.
*G09G 5/00* (2006.01)
*G06F 3/06* (2006.01)
*G06F 17/15* (2006.01)

(52) U.S. Cl.
CPC ............ *G06F 3/0656* (2013.01); *G06F 3/061* (2013.01); *G06F 3/0673* (2013.01); *G06F 17/153* (2013.01)

(58) Field of Classification Search
CPC ..... G06N 3/08; G06F 17/153; G06F 15/8046; G06F 17/16; G06F 7/5443
See application file for complete search history.

(56) References Cited

U.S. PATENT DOCUMENTS

2018/0046437 A1\* 2/2018 Lo ........................... G06F 17/16

\* cited by examiner

*Primary Examiner* — Hau H Nguyen
(74) *Attorney, Agent, or Firm* — Christopher P. Maiorana, PC (57) ABSTRACT

An apparatus includes a memory and a circuit. The memory may be configured to store data. The circuit generally has a buffer and may be configured to (i) fetch a kernel from the memory, where the kernel may have a plurality of kernel values, (ii) fetch a block from the memory to the buffer, where the block may have a plurality of input tiles and each of the input tiles may have a plurality of input values in multiple dimensions, (iii) calculate a plurality of intermediate values in parallel by multiplying the input tiles read from the buffer with a corresponding one of the kernel values and (iv) calculate an output tile that may have a plurality of output values based on the intermediate values.

20 Claims, 6 Drawing Sheets

FIG. 8

CONVOLUTION CALCULATIONS IN MULTIPLE DIMENSIONS

FIELD OF THE INVENTION

The invention relates to computer vision processing generally and, more particularly, to a method and/or apparatus for implementing convolution calculations in multiple dimensions.

BACKGROUND

Convolution operations are a building block of convolutional neural networks that are state-of-the-art in computer vision tasks like object recognition. Many conventional designs include some form of hardware drawbacks or limitations. A common design approach is to fetch two-dimensional input data and process the values for each output element separately. The separate fetches are inefficient. Memory bandwidth is wasted due to redundant fetches. To mitigate the bandwidth issue, other common designs use a row buffer to avoid re-fetching the same data. However, the row buffers utilize significant hardware while also limiting the flexibility of window sizes.

It would be desirable to implement convolution calculations in multiple dimensions.

SUMMARY

The invention concerns an apparatus including a memory and a circuit. The memory may be configured to store data. The circuit generally has a buffer and may be configured to (i) fetch a kernel from the memory, where the kernel may have a plurality of kernel values, (ii) fetch a block from the memory to the buffer, where the block may have a plurality of input tiles and each of the input tiles may have a plurality of input values in multiple dimensions, (iii) calculate a plurality of intermediate values in parallel by multiplying the input tiles read from the buffer with a corresponding one of the kernel values and (iv) calculate an output tile that may have a plurality of output values based on the intermediate values.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing convolution calculations in multiple dimensions that may (i) minimize memory bandwidth consumption, (ii) use minimal hardware for flexible window configurations, (iii) support unlimited kernel sizes, (iv) support flexible preemption, (v) operate in a mode to reduce redundant memory accesses across overlapping input windows, (vi) avoid large memories and/or (vii) be implemented as one or more integrated circuits.

Embodiments of the invention may provide an efficient and versatile solution for computer vision implementation to calculate convolutions (also called cross-correlations) using a one-dimensional or higher-dimensional kernel. The convolutions may be useful in computer vision operations such as object detection, object recognition, edge enhancement, image smoothing, and the like. Techniques and/or architectures implemented by the invention may be operational to calculate a convolution of an input array with a kernel. Given a two-dimensional input array (e.g., an input vector M of size P×Q), and a two-dimensional kernel (e.g., a kernel vector K of size I×J), an output array (e.g., an output vector N of size P×Q) of a two-dimensional convolution may be expressed by formula 1 as follows:

$$N[p,q] = \text{Sum over all } i,j \text{ of } (M[p-I/2+i, q-J/2+j] \times K[i,j]) \quad (1)$$

Each element (e.g., pixel) in the output array may be based on a region of the input data values that matches the size of the kernel around the corresponding input data value.

The techniques and architectures implemented by the invention may be readily extended to three dimensions and four dimensions. For convenience, the dimensions of the four-dimensional vectors from lowest to highest may be named as width/columns, height/rows, depth/channels, plane/planes. With a three-dimensional input array (e.g., an input vector M of size P×Q×R) and a three-dimensional kernel array (e.g., a kernel vector K of size I×J×L), two options are generally available: single-channel and cross-channel. In the single-channel option, each output channel N[p,q,r] may be a two-dimensional convolution result of a corresponding input channel as expressed by formula 2 as follows:

$$N[p,q,r] = \text{Sum over all } i,j \text{ of } (M[p-I/2+i, q-J/2+j, r] \times K[i,j,r]) \quad (2)$$

In the cross-channel option, a single output channel N[p,q] may be a sum of all the two-dimensional convolutions as expressed by formula 3 as follows:

$$N[p,q] = \text{Sum over all } i,j,l \text{ of}(P[p-I/2+i, q-J/2+j, l]) < K[i,j,l]) \quad (3)$$

Various embodiments may have multiple planes in the kernel, with a separate three-dimensional kernel for each output channel (e.g., cross-channel case) or sets of channel (e.g., single-channel case). In some embodiments, a three-dimensional image multiplied by a four-dimensional kernel may result in a three-dimensional output array.

The technique may also support decimation of the input data values in a horizontal dimension and/or vertical dimension, where the output values are calculated for only for every Ath column and/or Bth row, where A may be an integer of one or greater and B may be an integer of one or greater.

Figure 1:
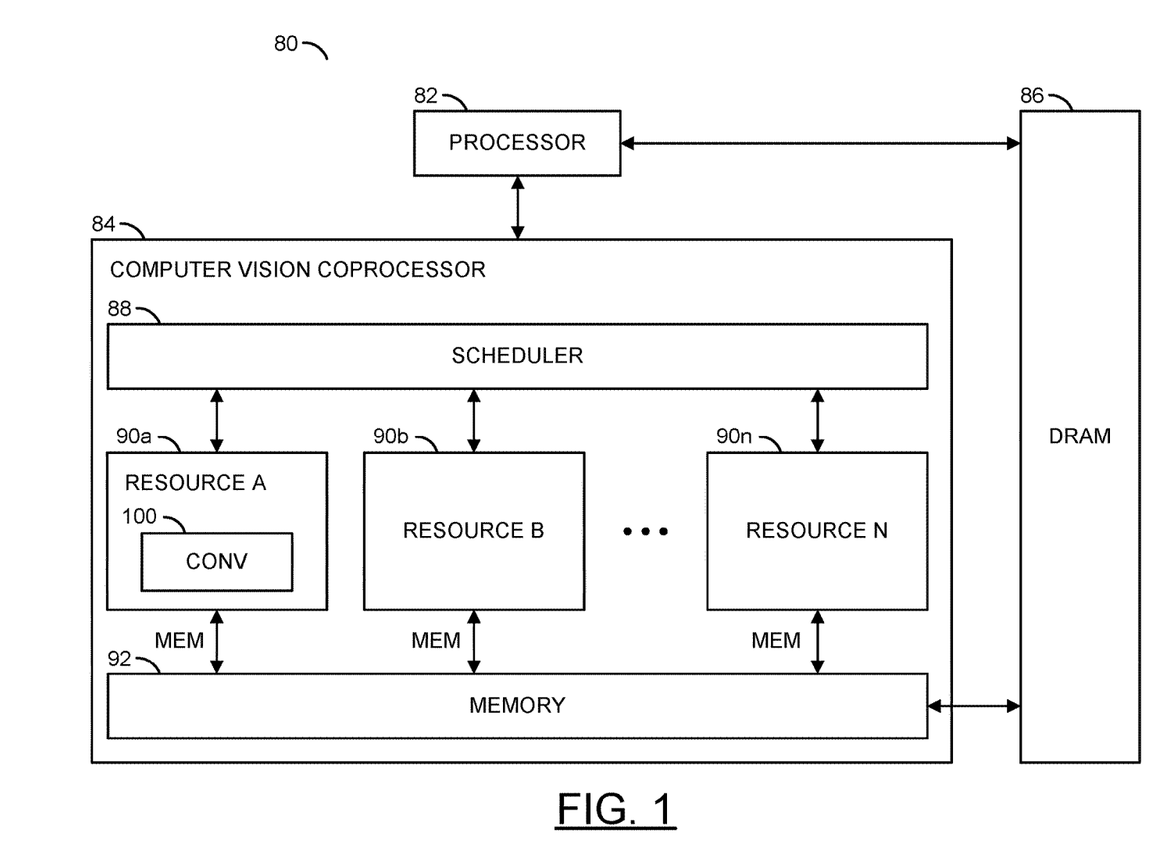
FIG. 1 is a diagram of a system.

Referring to FIG. 1, a diagram of a system 80 is shown. The system (or apparatus) 80 may implement a computer vision system. The apparatus 80 may be implemented as part of a camera, a computer, a server (e.g., a cloud server) a telephone (e.g., a smart phone), a personal digital assistant, or the like. The apparatus 80 generally comprises a block (or circuit) 82, a block (or circuit) 84, and a block (or circuit) 86. The circuit 84 generally comprises a block (or circuit) 88, one or more blocks (or circuits) 90a-90n, and a block (or circuit) 92. One or more of the circuits 90a-90n (e.g., circuit 90a as shown) generally comprises a block (or circuit) 100.

The circuit 82 may implement a processor circuit. In some embodiments, the processor circuit 82 may be a general purpose processor circuit. The processor circuit 82 may be operational to interact with the circuit 84 and the circuit 86 to perform various computer vision tasks.

The circuit 84 may implement a coprocessor circuit. In some embodiments, the coprocessor circuit 84 may be computer vision coprocessor circuit 84. The coprocessor circuit 84 is generally operational to perform specific computer vision tasks as arranged by the processor circuit 82.

The circuit 86 may implement a dynamic random access memory (DRAM) circuit. The DRAM circuit 86 is generally operational to store multidimensional arrays of input data and various forms of output data. The DRAM circuit 86 may exchange the input data and the output data with the processor circuit 82 and the coprocessor circuit 84.

The circuit 88 may implement a scheduler circuit. The scheduler circuit 88 is generally operational to schedule tasks among the circuits 90a-90n to perform a variety of computer vision tasks as defined by the processor circuit 82. Individual tasks may be allocated by the scheduler circuit 88 to the circuits 90a-90n.

Each circuit 90a-90n may implement a processing resource (or engine). The resource circuits 90a-90n are generally operational to perform specific processing tasks. In some configurations, the resource circuits 90a-90n may operate in parallel (or simultaneously) and independent of each other. In other configurations, the resource circuits 90a-90n may operate collectively among each other to perform allocated tasks. The resource circuits 90a-90n may be homogenous processing resources (all circuits 90a-90n may have the same capabilities) or heterogeneous processing resources (two or more circuits 90a-90n may have different capabilities). In various embodiments, the resource circuits 90a-90n may be implemented solely in hardware.

The circuit 92 may implement a memory circuit. The memory circuit 92 is generally operational to store portions of the multidimensional arrays of input data and output data generated by the resource circuits 90a-90n. The input data may be received from the DRAM circuit 86 via a memory bus. The output data may be sent to the DRAM circuit 86 via the memory bus.

The circuit 100 may implement a convolution circuit. The convolution circuit 100 may be in communication with the memory circuit 92 to receive the input data and present the output data. The convolution circuit 100 is generally operational to fetch a plurality of data vectors from the memory circuit 92. Each data vector may comprise a plurality of the data values. The convolution circuit 100 may also be operational to fetch a kernel from the memory circuit 92. The kernel generally comprises a plurality of kernel values. The convolution circuit 100 may also be operational to fetch a block from the memory circuit 92 to an internal (or local) buffer. The block generally comprises a plurality of input tiles. Each input tile may comprise a plurality of input values in multiple dimensions. The convolution circuit 100 may also be operational to calculate a plurality of intermediate values in parallel by multiplying each input tile in the internal buffer with a corresponding one of the kernel values and calculate an output tile comprising a plurality of output values based on the intermediate values. In various embodiments, the convolution circuit 100 may be implemented solely in hardware.

Figure 2:
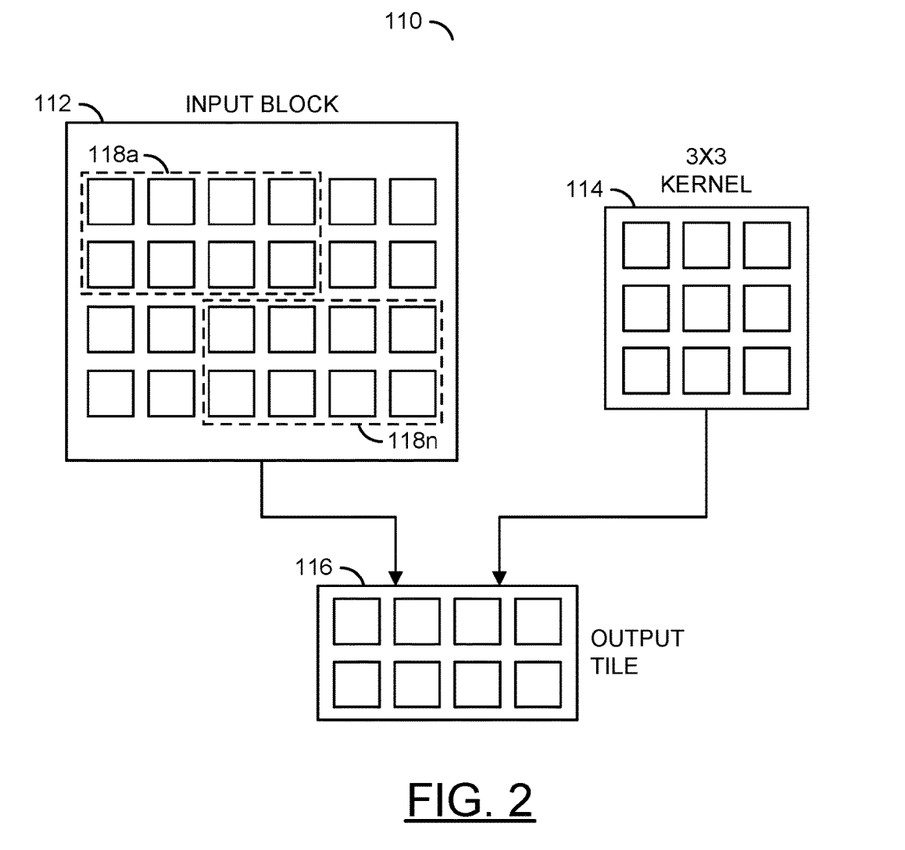
FIG. 2 is a diagram illustrating a convolution.

Referring to FIG. 2, a diagram illustrating an example convolution is shown. Input data received by the convolution generally comprises an input block 112 and a kernel 114. Output data generated by the convolution may comprise an output tile 116.

The input bock 112 generally comprises multiple input tiles 118a-118n. Each input tile 118a-118n may comprise a two-dimensional array of input data values (e.g., white squares). In typical computer vision applications, the input data values may be pixel values from a camera or other two-dimensional sensor. The kernel 114 generally comprises a one-dimensional or many-dimensional array of kernel values. To illustrate the operation of the invention, the kernel array 114 may be shown in FIG. 2 as a 3×3 array. Other sizes and dimensions of kernel arrays 114 may be implemented to meet the design criteria of a particular application. Various embodiments of the convolution may use synthesized input data values outside the input image. The synthesized input data values may either be replications of actual input data values at the boundaries of the input image or set to a default value (e.g., zero value) to calculate the output data values near the boundaries.

Each "tile" may be a two-dimensional region (e.g., H rows×W columns) of the input vector (e.g., the input vectors 118a-118n) or the output vector (e.g., the output tile 116). In some embodiments, the height H may be one to several (e.g., 1, 2, 4 or 8) elements tall. The width W may be one to several (e.g., 1, 2, 4, 8 or 16) elements wide. The data values may be transferred to and from the memory 92 in multi-bit (e.g., 8, 16 or 32 bit) chunks. For example, the width W may be 2, 4 or 8 elements wide for 16-bit data values and 4, 8 or 16 elements for 8-bit data values. Each block (e.g., the input block 112) may be a region of information used to calculate a single output tile (e.g., the output tile 116).

During some computer vision tasks, the input data values and the kernel values may be transferred from the DRAM circuit 86 to the memory circuit 92, a few columns at a time. The convolution circuit 100 may multiply the input data values by the kernel values to generate an array of output values in the output tile 116. The output tile 116 may be stored back in the memory circuit 92 and subsequently transferred to the DRAM circuit 86.

To efficiently process the input data values, an overlap between the input tiles 118a-118b may be used for adjacent pixels. For two-dimensional kernels, input bandwidth from the memory circuit 92 may be saved by producing the output data values as two-dimensional tiles or arrays (e.g., the output tile 116). For three-dimensional kernels or four-dimensional kernels, the output value values may be produced as a stack of the two-dimensional tiles. The stacking generally improves the input bandwidth from the memory circuit 92 since the same three-dimensional input block contributes to all tiles in the three-dimensional output tile stack. The regularity of the convolution process means that formula 1 for summation over the input elements in may be rewritten as a summation over all relevant i,j,l of an input tile corresponding to i,j,l×K[i,j,l].

Figure 3:
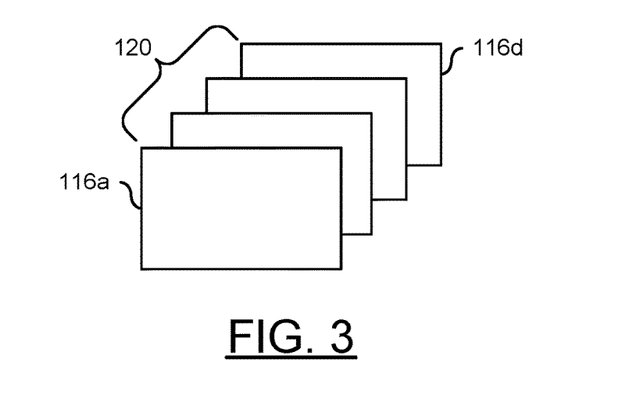
FIG. 3 is a diagram of a stacked array of tiles.

Referring to FIG. 3, a diagram of an example stacked array of tiles 120 is shown. For three-dimensional or higher-dimensional convolutions, the convolution circuit 100 may divide the input data values and the kernel values into multiple two-dimensional channels. The two-dimensional channels may be multiplied to generate multiple channels of output tiles 116a-116d. The output tiles 116a-116d may be stacked to form a three-dimensional or higher-dimensional stacked array (or vector) of tiles 120. In a tile stack (e.g., the stack 120), all of the tiles (e.g., the tiles 116a-116d) may have the same row and column coordinates. The tiles generally differ only in plane and/or channel coordinates.

Figure 4:
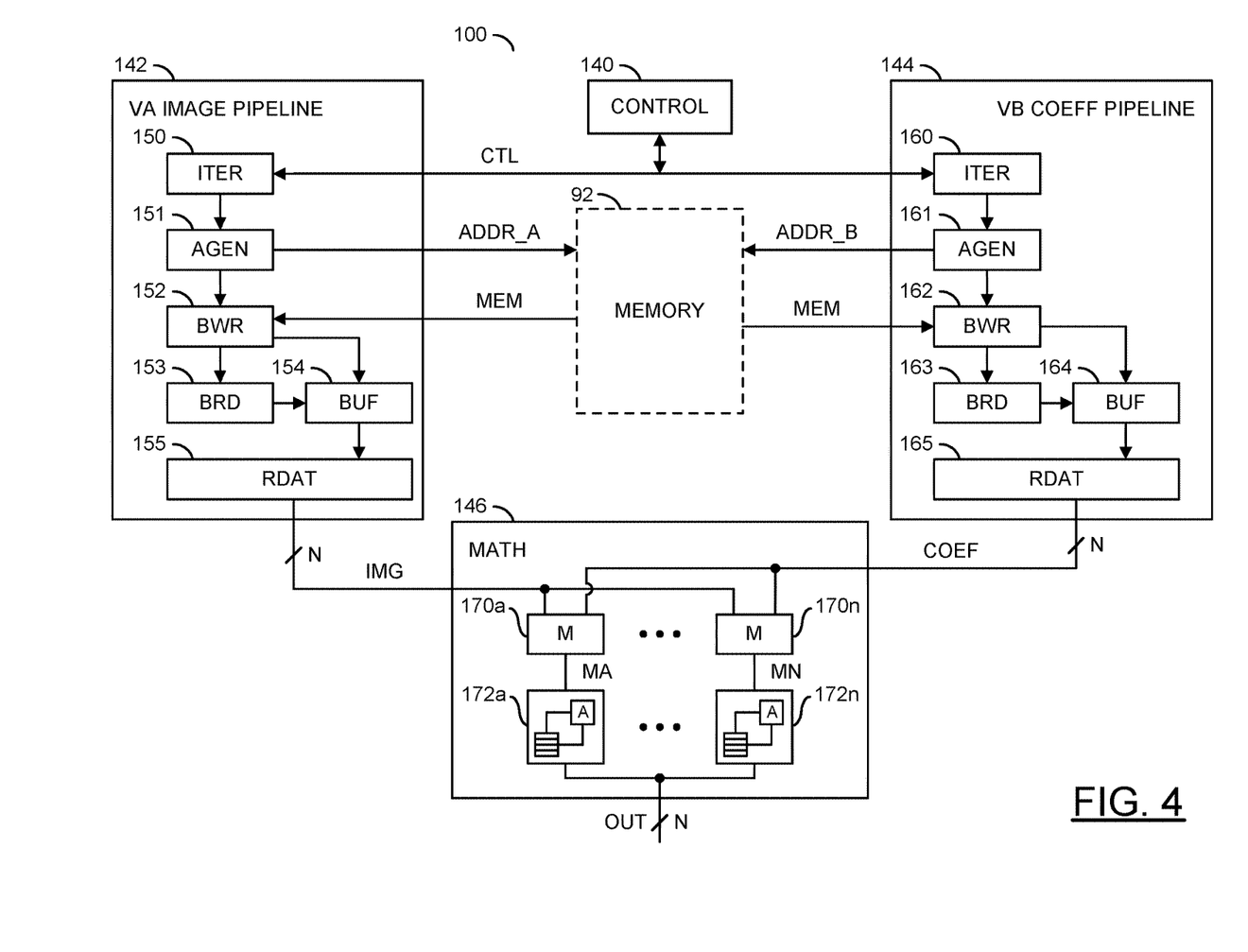
FIG. 4 is a block diagram of a convolution circuit in accordance with an embodiment of the invention.

Referring to FIG. 4, a block diagram of an example implementation of the convolution circuit 100 is shown in accordance with an embodiment of the invention. The convolution circuit 100 generally comprises a block (or circuit) 140, a block (or circuit) 142, a block (or circuit) 144, and a block (or circuit) 146. In various embodiments, the circuits 140-146 may be implemented solely in hardware.

A signal (e.g., CTL) may be exchanged among the circuit 140, the circuit 142 and the circuit 144. The signal CTL may convey control information. A signal (e.g., ADDR_A) may be generated by the circuit 142 and presented to the memory circuit 92. The signal ADDR_A may carry address information used to read the input data values. A signal (e.g., ADDR_B) may be generated by the circuit 144 and received by the memory circuit 92. The signal ADDR_B may convey address information used to read the kernel values. The signal MEM may be received by the circuit 142 and the circuit 144. The signal MEM received by the circuit 142 may carry the input data values. The signal MEM received by the circuit 144 may carry the kernel values. A signal (e.g., IMG) may be generated by the circuit 142 and received by the circuit 146. The signal IMG may transfer fetched image data (e.g., the fetched input data values). A signal (e.g., COEF) may be generated by the circuit 144 and transferred to the circuit 146. The signal COEF may carry fetched coefficient data (e.g., the fetched kernel values). A signal (e.g., OUT) may be generated and presented by the circuit 146. The signal OUT may convey the output data values of the output tiles 116.

The circuit 140 may implement a control circuit. The control circuit 140 is generally operational to setup, control and provide centralized scheduling for the operations in the circuit 142 and the circuit 144. The setup, control and scheduling may be provided by the control information presented in the signal CTL. Feedback for the operations in the circuit 142 and the circuit 144 may be presented back to the control circuit 140 in the signal CTL.

The circuit 142 may implement a pipeline circuit. In various embodiments, the pipeline 142 may operate on image data. The image pipeline 142 may be configured to fetch the input data values from the memory circuit 92 in the signal MEM. The fetched image data may be presented in the signal IMG to the circuit 146. The image pipeline 142 generally comprises a block (or circuit) 150, a block (or circuit) 151, a block (or circuit) 152, a block (or circuit) 153, a block (or circuit) 154, and a block (or circuit) 155. In various embodiments, the circuits 150-155 may be implemented solely in hardware. The circuit 150 may exchange the signal CTL with the circuit 140. The circuit 151 may generate the signal ADDR_A. The signal MEM may be received by the circuit 152. The signal IMG may be generated by the circuit 155.

The circuit 144 may implement another pipeline circuit. In various embodiments, the pipeline 144 may operate on kernel coefficient data. The coefficient pipeline 144 may be configured to fetch the kernel data values received from the memory circuit 92 in the signal MEM. The fetched kernel data may be presented in the signal COEF to the circuit 146. The coefficient pipeline 144 generally comprises a block (or circuit) 160, a block (or circuit) 161, a block (or circuit) 162, a block (or circuit) 163, a block (or circuit) 164, and a block (or circuit) 165. In various embodiments, the circuits 160-165 may be implemented solely in hardware. The circuit 160 may exchange with signal CTL with the circuit 140. The circuit 161 may generate the signal ADDR_B. The signal MEM may be received by the circuit 162. The signal COEF may be generated by the circuit 165.

The circuit 146 may implement a mathematics circuit. The mathematics circuit 146 is generally operational to multiply and accumulate the fetched input data received in the signal IMG with the fetched kernel data received in the signal COEF. The resulting output data may be presented in the signal OUT. The mathematics circuit 146 generally comprises multiple blocks (or circuits) 170a to 170n, and multiple blocks (or circuits) 172a to 172n. In various embodiments, the circuits 170a-172n may be implemented solely in hardware. Multiple signals (e.g., MA-MN) may be generated by the circuit 170a-170n and presented to the circuits 172a-172n, respectively. The signals MA-MN may carry intermediate results. The signal OUT may be generated collectively by the circuit 172a-172n.

Each circuit 150 and 160 may implement an iteration (ITER) circuit. The iteration circuits 150 and 160 are generally operational to generate respective sequence of tiles used in the current convolution. In various embodiments, an initial part of the iteration circuits 150 and 160 generate a sequence of the output tiles (or corresponding input blocks) to produce. Next, each two-dimensional or higher-dimensional input block may be broken down into a sequence of input tiles used to produce each output tile. The iteration circuits 150 and 160 may communicate with the control circuit 140 to make sure that data is available before proceeding. The availability of the data generally avoids pipeline hangs and keeps the two pipelines 142 and 144 in synchronization.

Each circuit 151 and 161 may implement an address generator (AGEN) circuit. The address generators 151 and 161 may be operational to fetch data from the memory circuit 92 via the signal MEM into local buffers. The address generator 151 may present addresses in the signal ADDR_A for the input data. The address generator 161 may present addresses in the signal ADDR_B for the kernel data. The address generators 151 and 161 may also keep track of what data is in the local buffers and annotate each tile coming in with appropriate buffer location information.

Each circuit 152 and 162 may implement a buffer write (BWR) circuit. The buffer write circuits 152 and 162 are generally operational to receive data from the memory circuit 92 via the signal MEM. Each buffer write circuit 152 and 162 may write the received data into the local buffers at the appropriate locations.

Each circuit 153 and 163 may implement a buffer read (BRD) circuit. The buffer read circuits 153 and 163 are generally operational to cause data to be read out of the respective local buffer circuits. The read data may be presented from the local buffer circuits to the circuits 155 and 165, respectively.

Each circuit 154 and 164 may implement a local buffer (BUF) circuit. The local buffer circuits 154 and 164 are generally operational to temporarily store (or buffer) the data written by the buffer write circuits 152 and 162, respectively. In some embodiments, the local buffers 154 and 164 may implement a random access capability.

The local buffer circuit 154 in the image pipeline 142 may be arranged as multiple (e.g., 12-20) memories with multiple (e.g., 64-256) words in each memory. Each word may have multiple (e.g., 8-64) bits. In an example embodiment, the local buffer circuit 154 generally comprises 16 memories, each memory having 128 words, and each word being 32 bits long. An example addressing scheme of the 16×128=2048 words is generally illustrated in Table 1 as follows:

TABLE 1

| Memory 0 | Memory 1 | Memory 2 | ... | Memory 15 |
|---|---|---|---|---|
| Address 0 | Address 1 | Address 2 | ... | Address 15 |
| Address 16 | Address 17 | Address 18 | ... | Address 31 |
| ... | ... | ... | | ... |
| Address 2032 | Address 2033 | Address 2034 | ... | Address 2047 |

Each circuit 155 and 165 may implement a read data (RDAT) circuit. The read data circuits 155 and 165 are generally operational to send the data read out of the respective pipelines 142 and 144 to the mathematics circuit 146. The read data circuit 155 may transfer the buffered input data values in the signal IMG. The read data circuit 165 may transfer the buffered kernel values in the signal COEF. The read data circuit 165 may also replicate the coefficient data as appropriate since each individual coefficient generally corresponds to a whole input tile of input data.

Each circuit 170a-170n may implement a multiplier circuit. The multiplier circuits 170a-170n are generally operational to multiply a kernel value received in the signal COEF with a corresponding input data value received in the signal IMG. The mathematics circuit 146 may implement multiple parallel (e.g., 12-20) multiplier circuits 170a-170n. The mathematics circuit 146 may implement multiple parallel (e.g., 12-20) multiplier circuits 170a-170n. Each multiplier circuit 170a-170n may be configured to handle multi-bit (e.g., X=8-bit) input values. Some multiplier circuits 170a-170n (e.g., lower eight multipliers) may also be configured to handle wider (e.g., Y=16-bit) input values. As such, the convolution circuit 100 may operate on X×Y bits (e.g., 8×16 bits), X×X bits (e.g., 8×8 bits), Y×X bits (e.g., 16×8 bits) or Y×Y bits (e.g., 16×16 bits) of data per clock cycle, trading off precision for performance. In embodiments having 16 multiplier circuits 170a-170n with 8 bits per word, a width N of the signals IMG and COEF may be 128 bits.

Each circuit 172a-172n may implement an accumulator circuit. The accumulator circuits 172a-172n are generally operational to accumulate products of the multiplications of the input data values and the kernel values. Each accumulator circuit 172a-172n generally stores the state for multiple (e.g., 8) separate (e.g., parallel or simultaneous) accumulations. The separate accumulations may allow sharing of accumulation logic used for all the rows of a tile without implementing dedicated adders for each row since each row may be accumulated in a separate cycle. The mathematics circuit 146 may implement multiple parallel (e.g., 12-20) accumulator circuits 172a-172n with an adder (A) in each accumulator. Each accumulator circuit 172a-172n may be configured to handle multi-bit data values. A width of the multi-bit data values (e.g., X=24-bit) is generally wider than a precision of an output of the multiplier circuits 170a-170n (e.g., 16 bits for an 8×8 multiplication). Some accumulator circuits 172a-172n (e.g., lower eight accumulators) may also be configured to handle wider data values (e.g., 48 bits to accumulate 32-bit products of 16×16 bit multiplications). As such, the convolution circuit 100 may operate on X×Y bits (e.g., 8×16 bits), X×X bits (e.g., 8×8 bits), Y×X bits (e.g., 16×8 bits) or Y×Y bits (e.g., 16×16 bits) of data per clock cycle, trading off precision for performance. At an end of the accumulation phase, a precision of the final results may be reduced (e.g., reduced to 16-bit values or 8-bit values). In embodiments having 16 multiplier circuits 170a-170n with 16 bits per word, a width N of the signals IMG and COEF may be 256 bits. Other final precision values may be implemented to meet the design criteria of a particular application.

When an entire input region used for a single output tile or single tile stack (i) fits inside the local buffer 154 and (ii) is smaller than a maximum size that may be requested from the memory circuit 92, a corresponding input region (e.g., block) may be fetched from the memory circuit 92 and stored in the local buffer 154 for each output tile. The input tiles may be extracted from the block in the local buffer 154 repeatedly for the convolution calculations for the current output tile. Once the current output tile has been processed, the convolution circuit 100 may move to a next output tile. Power and memory bandwidth may be saved due to data reuse of horizontal and/or vertical overlaps between the tiles.

Each input tile may correspond to a single kernel coefficient. The correspondence generally allows the coefficient fetching logic (e.g., the circuits 160, 161 and 162) in the coefficient pipeline 144 to run much slower than the image fetching logic (e.g., the circuit 150, 151 and 152) in the image pipeline 142. Running the fetching logic at different speeds may save on hardware and/or power consumption.

For cases of small kernels, overlap in the blocks for adjacent output tiles generally exists. For such cases, data may be reused across horizontally adjacent blocks, fetching only the incrementally new data. While fetching individual tiles, when possible, the input data may be reused across horizontally adjacent tiles to reduce bandwidth consumption of the memory circuit 92.

For large kernels, the input data region corresponding to each output tile may be too large to fit in the local buffer 154. To support input block sizes much larger than the local buffer 154 supports (e.g., unlimited kernel sizes), each input tile may be fetched from the memory circuit 92 to the local buffer 154 as used. Fetching data as it is used generally allows the size of the local buffer 154 to remain modest while supporting larger kernel sizes.

For the sparse kernels, the image pipeline 142 may read from a local buffer only the input tile corresponding to the non-zero valued coefficients in the kernel. In a regular-sparse mode, an additional path may be implemented from the read data circuit 165 to the iteration circuit 150 because the sequence of input tiles to be accessed generally depends on the coefficient data available in the local buffer 164.

For the ultra-sparse kernels, the image pipeline 142 may fetch only the input tiles corresponding to non-zero valued coefficients in the kernel. In an ultra-sparse mode, an additional path may be implemented from the read data circuit 165 to the iteration circuit 150 because the sequence of input tiles to be accessed generally depends on the coefficient data available in the local buffer 164.

In some applications, convolution results may not be specified for all input data values (e.g., pixels). For such cases, the convolution circuit 100 may support decimation. The decimation factor may be the same or different in various dimensions. For example, the output values may be calculated for every Ath input data value in one or more of the dimensions (e.g., the horizontal dimension and/or vertical dimension). In another example, the output values may be calculated for every Ath input data value in some dimensions (e.g., the horizontal dimension) and for every Bth input data value in other dimensions (e.g., the vertical dimensions). In some situations, the decimation factor A and/or B may be unity (e.g., no decimation).

In case of horizontal decimation and/or vertical decimation with a large and sparse kernel, the image pipeline 142 may fetch pre-decimated input tiles to further reduce the memory bandwidth consumption. The input tiles may be pre-decimated by the memory circuit 92, one of the resource circuits 90a-90n and/or the processor circuit 82.

The convolution circuit 100 may produce the output data values for a single output tile at a time. The output tile-by-output tile approach may help with flexible scheduling and preemption. Each output tile may be independent of the other output tiles and so the calculations may be stopped and resumed at any arbitrary boundary between any two output tiles.

Figure 5:
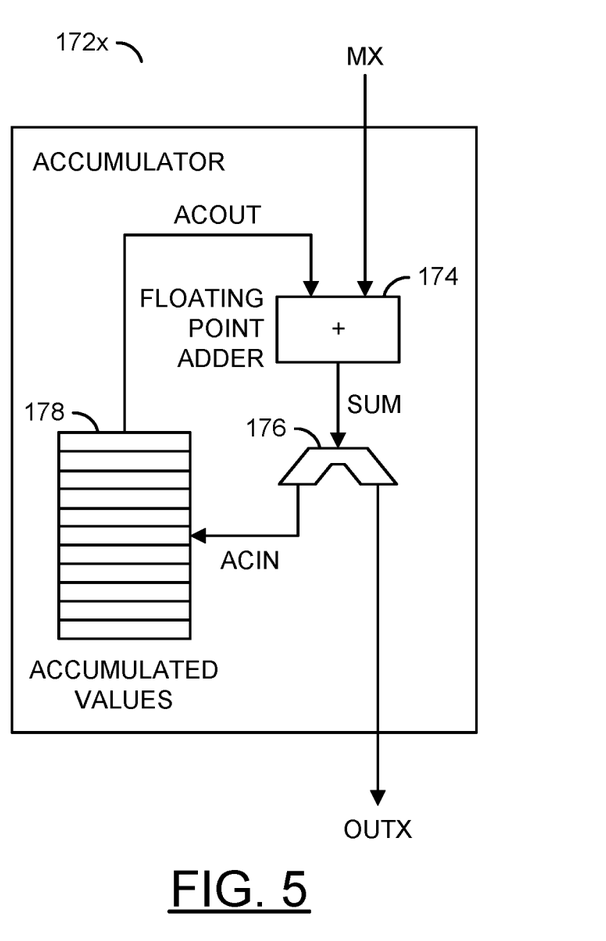
FIG. 5 is a block diagram of an accumulator circuit.

Referring to FIG. 5, a block diagram of an example implementation of an accumulator circuit 172x is shown. The accumulator circuit 172x may be representative of each of the accumulator circuits 172a to 172n. The accumulator circuit 172x generally comprises a block (or circuit) 174, a block (or circuit) 176 and a block (or circuit) 178. In various embodiments, the circuits 174-178 may be implemented solely in hardware.

A signal (e.g., MX) may be received by the circuit 174. The signal MX may be representative of each signal MA-MN (see FIG. 4). The signal MX may convey the intermediate multiplication products from a corresponding multiplier circuit 170a-170n. A signal (e.g., ACOUT) may be generated by the circuit 178 and transferred to the circuit 174. The signal ACOUT may carry accumulated values read out of the circuit 178. The circuit 174 may generate a signal (e.g., SUM) received by the circuit 176. The signal SUM may carry a sum of the multiplication products received in the signal MX and the accumulated values received in the signal ACOUT. The circuit 176 may generate a signal (e.g., ACIN). The signal ACIN may carry the accumulated values being written into the circuit 178. A portion of the signal OUT (e.g., OUTX) may be generated by the circuit 176.

The circuit 174 may implement a floating point adder circuit. The floating point adder circuit 174 is generally operational to add the multiplier product values received in the signal MX with the accumulated values received in the signal ACOUT to calculate sum values. The sum values may be presented in the signal SUM.

The circuit 176 may implement a demultiplexer circuit. The demultiplexer circuit 176 is generally operational to route the sum values to the circuit 178 in the signal ACIN and in the output signal OUTX. While the accumulator circuit 172x is accumulating components of an output value in an output tile, the demultiplexer circuit 176 may route the intermediate accumulated values back to the circuit 178. Once all of the components of an output value in the output tile have been added together, the demultiplexer circuit 176 may reduce the resolution and route the final sum value to the signal OUTX as the calculated output value.

The circuit 178 may implement an accumulation register circuit. The accumulation register 178 is generally operational to buffer (or store) the intermediate accumulation values calculated by the floating point adder circuit 174 and received in the signal ACIN. The accumulation register 178 may also be operational to present the intermediate accumulation values back to the floating point adder circuit 174 in the signal ACOUT.

Efficiency of the convolution circuit 100 may be obtained by arranging the data in the local buffer 154 to work best with a data access pattern. Embodiments of the invention may implement multiple data access patterns among multiple modes. The possible modes may include, but are not limited to, an overlapping-blocks mode, an overlapping-tiles mode and an individual-tile mode. A current mode may be determined by the controller circuit 140 based on the vector dimensions. The current mode generally affects the behavior of all the circuits 150-155 in the image pipeline 142.

Figure 6:
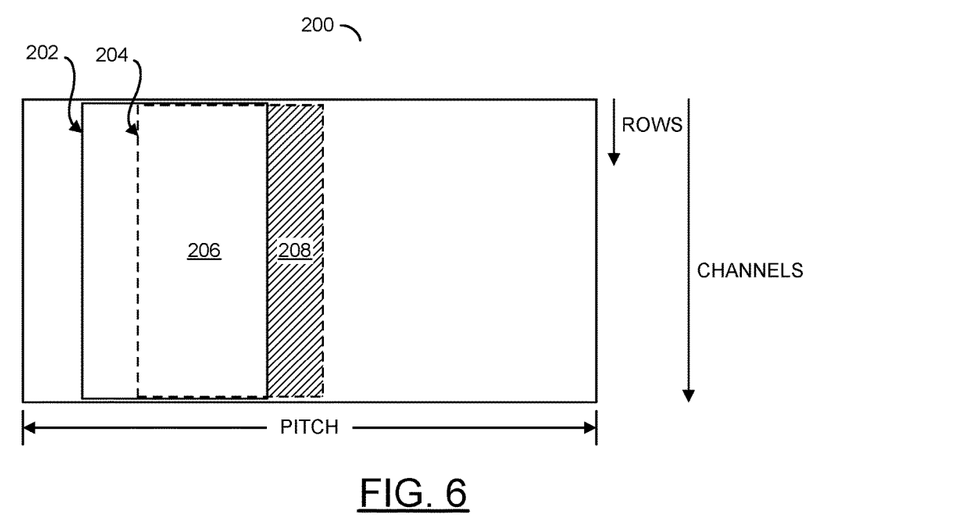
FIG. 6 is a diagram of an arrangement of data in a local buffer in an overlapping-blocks mode.

Referring to FIG. 6, a diagram 200 of an example arrangement of data the local buffer 154 in the overlapping-blocks mode is shown. The overlapping-blocks mode generally fetches whole two-dimensional or three-dimensional blocks, reusing overlapping data between horizontally adjacent blocks. A pitch may be calculated per formula 4 as follows:

$$\text{pitch}=\text{round\_down\_to\_multiple\_of\_buffer\_width}(\text{buffer size}/(\text{block.rows}\times\text{block.channels})) \quad (4)$$

The input data value in the local buffer 154 may be arranged as shown in the diagram 200. A base address in the local buffer 154 of an initial complete block 202 may be defined at a left edge of the block 202. A base address in the local buffer 154 of a next horizontally adjacent block 204 may be defined at the left edge of the block 204. A region 206 may be a complete region fetched for the block 202. A region 208 may be an incremental region fetched for the block 204. The incremental region (or additional vector) 208 may be appended to the region 206 in the local buffer 154 to buffer all of the input data values that reside in the block 204. The input data values for the block 204 may be bounded by the base address of the block 204 on the left side and by the right side of the region 208.

With the structure illustrated, input data values may be reused across adjacent blocks by updating the base address and fetching the missing data. Each row of any tile may be stored spread out across different memories in the local buffer 154, allowing conflict-free access to any whole tile row. In addition, having multiple (e.g., 16) memories may reduce the number of conflicts between writing blocks into the local buffer 154 and reading tiles out of the local buffer 154.

The overlapping-tiles mode may be similar to the overlapping-blocks mode, except that tiles may be arranged in the local buffer 154 instead of blocks. In the individual-tile mode, each tile may be fetched separately. The input data values may be arranged as a sequence of tiles, with successive tiles located at increasing buffer addresses.

The controller circuit 140 may determine the current mode as follows. If the kernel is sparse and large, the current mode may be the individual-tile mode. Otherwise, if a single block fits into the local buffer 154, the current mode may be the overlapping-blocks mode. If the kernel is in a dense mode, the controller circuit 140 may select the overlapping-tiles mode as the current mode. Otherwise, the individual-tile mode may be selected as the current mode.

Figure 7:
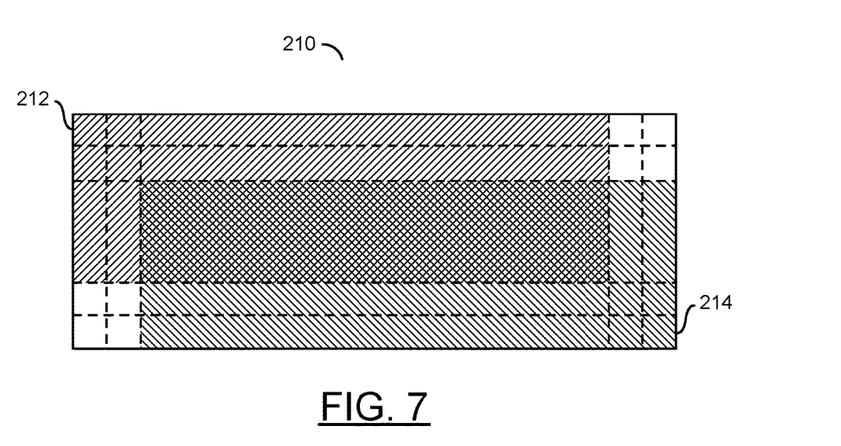
FIG. 7 is a diagram of a section of an image used to calculate an output tile partitioned into multiple overlapping input tiles.

Referring to FIG. 7, a diagram of a section of an example image 210 used to calculate an output tile partitioned into multiple overlapping input tiles is shown. The image 210 may be smoothed by the convolution circuit 100 using a dense two-dimensional convolution. The image size may be large (e.g., 1024×768 pixels with 8 bits per pixel), and the kernel size may be small (e.g., 3×3). The output tile in the example may be a modest sized array (4 rows×16 columns). The input block size may be larger than the output tile size as expanded the kernel size (e.g., 6×18 resulting from the 4×16 output tile size expanded by the 3×3 kernel size). The local buffer 154 may be arranged with a pitch defined by formula 4 (e.g., 336 32-bit words=(2048/6) rounded down to a multiple of 16). The initial whole block may be fetched from the memory circuit 92 into the local buffer 154. Several (e.g., 9) tiles 212-214 may be read from the local buffer 154 for subsequent convolving operations. For each subsequent block to be processed, an incremental column of data along the right edge of the current block may be fetched from the memory circuit 92 to the local buffer 154.

In another example, convolution neural networks (CNN) are computer vision applications that utilize dense three-dimensional convolutions. An example CNN layer may comprise a 16×100×50 input image with a 8×16×5×5 kernel in the cross-channel mode and produces 8×100×50 output elements. If the tile size is set to 2×2 by the control circuit 140, each input block may be 16×6×6. The resulting three-dimensional overlapping blocks may have a pitch of 16 words (e.g., 16=2048/(16×6) rounded down). The output tile stack may be produced by the convolution circuit 100 a single tile stack at a time allowing each input block to be fetched just once instead of multiple times (e.g., as many as the number of output channels).

An example sparse three-dimensional cross-convolution may utilize the same inputs and outputs as the CNN example, except that the kernel is sparse (many or most kernel entries have a zero value). If the degree of sparseness is typical (e.g., a regular sparse kernel), the control circuit 140 may set up the local buffer 154 same as in the CNN example and fetch entire blocks as in the CNN example. Just the input tiles corresponding to the non-zero valued kernel coefficients may be read from the local buffer 154 and processed. While performing the accumulation in the mathematics circuit 146, the kernel coefficients that have the value of zero may be skipped, thereby increasing performance.

The degree of sparseness of the kernel may impact a fetch mode. In the overlapping-blocks mode, the amount of data fetched per output tile or tile stack may be a given block size. In the individual-tile mode, the amount of data fetches is generally the number of non-zero valued coefficients times the tile size. If the number of non-zero valued coefficients times the tile size is greater than the given block size, the overlapping-blocks mode may be used. Otherwise, the individual-tile mode may be used.

If the degree of sparseness is higher (e.g., an ultra-sparse kernel), whole blocks may not be fetched from the memory circuit 92 to the local buffer 154. Instead, the control circuit 140 may select the individual-tile mode, fetch just the input tiles corresponding to the non-zero valued kernel coefficients from the memory circuit 92 to the local buffer 154, and process the fetched/buffered input tiles. A threshold between the overlapping-blocks mode and the individual-tile mode generally depends on the specific arrangement of coefficients. In some embodiments, the selection between the overlapping-blocks mode and the individual-tile mode may be determined by software executing external to the convolution circuit 100 (e.g., in the processor 82).

Figure 8:
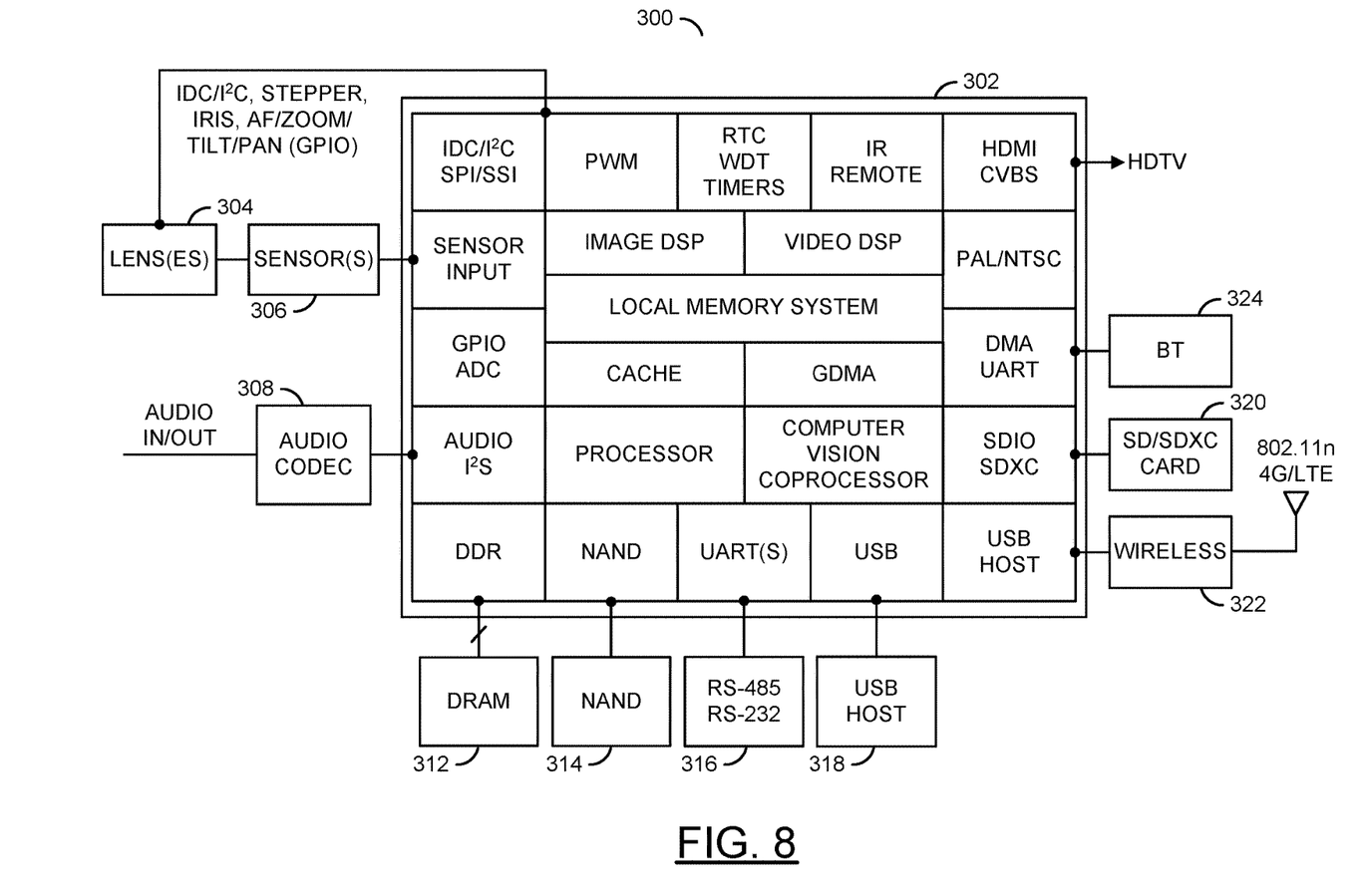
FIG. 8 is a diagram of a computer vision system.

Referring to FIG. 8, a diagram of a camera system 300 is shown illustrating an example implementation of a computer vision system in accordance with an embodiment of the present invention. In one example, the electronics of the camera system 300 may be implemented as one or more integrated circuits. For example, an application specific integrated circuit (ASIC) or system on chip (SOC) may be used to implement the camera system 300. In one example, the camera system 300 may comprise a processor/camera chip (or circuit) 302, one or more lens assemblies 304, one or more image sensors 306, an audio input/output circuit 308, which may include an optional audio codec, dynamic random access memory (DRAM) 312, non-volatile memory (e.g., NAND flash memory) 314, one or more serial interfaces 316, one or more universal serial bus (USB) interfaces for connecting to or acting as a USB host 318, an interface for connecting to a removable media 320 (e.g., SD, SDXC, etc.), a wireless interface 322, and a BLUETOOTH interface 324. In various embodiments, the wireless interface 322 and/or the USB Host 318 may be configured for communicating with a camera controller wirelessly.

The processor/camera circuit 302 may include a number of modules including a pulse width modulation (PWM) module, a real time clock, watch dog timer, and timers (RTC/WDT/TIMERS), an infrared (IR) remote interface, a high-definition multimedia interface (HDMI), a PAL/NTSC interface, a general purpose input/output (GPIO) and analog-to-digital converter (ADC) module, a direct memory access (DMA) universal asynchronous receiver transmitter (UART), a secure digital input/output (SDIO) and SD or xD (SDXC) card interface, an image sensor interface, and one or more of an inter-IC sound ($I^2S$) interfaces, an inter-IC control ($I^2C$) interface, and synchronous data communications interfaces (e.g., SPI, SSI, etc.). The circuit 302 may also include one or more embedded processors (e.g., ARM, etc.), the computer vision coprocessor, an encryption/decryption block, an image digital signal processor (DSP), a video DSP, a local memory system, a cache (e.g., L2 CACHE), and a graphics direct memory access (GDMA) engine. The circuit 302 may be configured (e.g., programmed) to control the one or lens assemblies 304 and the one or more image sensors 306. The circuit 302 may receive raw image data from the sensor 306. The circuit 302 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The circuit 302 may receive encoded and/or uncoded (e.g., raw) audio data from the audio input 308. The circuit 302 may also receive encoded audio data from the USB and/or SDIO interfaces. The circuit 302 may provide encoded video data to the wireless interface 322 (e.g., using the USB host interface). The wireless interface 322 may include support for wireless communication by one or more wireless and/or cellular protocols such as BLUETOOTH, ZIGBEE, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The circuit 302 may also include support for communication using one or more of the universal serial bus protocols (e.g., USB 1.0, 2.0, 3.0, etc.). The circuit 302 may also be configured to be powered via the USB connection. However, other communication and/or power interfaces may be implemented accordingly to meet the design criteria of a particular implementation.

The functions performed by the diagrams of FIGS. 1-8 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element. As used herein, the term "simultaneously" is meant to describe events that share some common time period but the term is not meant to be limited to events that begin at the same point in time, end at the same point in time, or have the same duration.

While the invention has been particularly shown and described with reference to embodiments thereof, it will be understood by those skilled in the art that various changes in form and details may be made without departing from the scope of the invention.

The invention claimed is:

1. An apparatus comprising:
   a memory configured to store data;
   a first circuit comprising a first buffer and configured to (i) fetch a kernel from said memory to said first buffer, wherein said kernel comprises a plurality of kernel values, and (ii) present said kernel values as stored in said first buffer in a first signal;
   a second circuit comprising a second buffer and configured to (i) fetch a block from said memory to said second buffer, wherein said block comprises a plurality of input tiles and each of said input tiles comprises a plurality of input values in multiple dimensions, and (ii) present said input tiles as stored in said second buffer in a second signal, wherein said first circuit fetches said kernel from said memory slower than said second circuits fetches said block from said memory; and
   a third circuit configured to (i) receive said kernel values from said first circuit in said first signal, (ii) receive said input tiles from said second circuit in said second signal, (iii) calculate a plurality of intermediate values in parallel by multiplying said input tiles with a corresponding one of said kernel values and (iv) calculate an output tile comprising a plurality of output values based on said intermediate values.

2. The apparatus according to claim 1, wherein said second circuit is further configured to (i) read said input tiles repeatedly from said second buffer and (ii) transfer said input tiles repeatedly in said second signal to said third circuit to calculate said output tile.

3. The apparatus according to claim 1, wherein said output tile comprises (i) a two-dimensional array of output values or (ii) a plurality of two-dimensional arrays of output values arranged in a three-dimensional stack.

4. The apparatus according to claim 1, wherein said second circuit is further configured to (i) fetch a plurality of additional vectors of said input values from said memory to said second buffer, and (ii) append said additional vectors to said block of said input values in said second buffer to feed calculations of a plurality of additional output tiles.

5. The apparatus according to claim 1, wherein said third circuit is further configured to reuse said input values received in said second signal from said second buffer across adjacent ones of said input tiles.

6. The apparatus according to claim 1, wherein said second circuit is further configured to spatially decimate said input tiles prior to transfer in said second signal to said third circuit.

7. The apparatus according to claim 1, wherein said second circuit is further configured to (i) read from said second buffer at most said input tiles that correspond to one or more non-zero values of said kernel values in said kernel and (ii) transfer in said second signal at most said one or more non-zero values of said kernel values in said kernel.

8. The apparatus according to claim 1, wherein said block fetched from said memory to said second buffer by said second circuit has at most said input tiles that correspond to one or more non-zero values of said kernel values in said kernel.

9. The apparatus according to claim 1, wherein said input tiles in said block as stored in said memory are spatially decimated prior to transferring from said memory to said second circuit.

10. The apparatus according to claim 1, wherein said memory, said first circuit, said second circuit and said third circuit form part of a computer vision system.

11. A method for convolution calculations in multiple dimensions, comprising the steps of:
    fetching a kernel from a memory to a first buffer in a first circuit, wherein said kernel comprises a plurality of kernel values;
    fetching a block from said memory to a second buffer in a second circuit, wherein (i) said block comprises a plurality of input tiles and each of said input tiles comprises a plurality of input values in said multiple dimensions and (ii) said first circuit fetches said kernel from said memory slower than said second circuits fetches said block from said memory;
    transferring said kernel values as stored in said first buffer from said first circuit to a third circuit in a first signal;
    transferring said input values as stored in said second buffer from said second circuit to said third circuit in a second signal;
    calculating a plurality of intermediate values in parallel in said third circuit by multiplying said input tiles with a corresponding one of said kernel values; and
    calculating an output tile comprising a plurality of output values in said third circuit based on said intermediate values.

12. The method according to claim 11, further comprising the steps of:
    reading said input tiles repeatedly from said second buffer; and
    transferring said input tiles repeatedly in said second signal to said third circuit to calculate said output tile.

13. The method according to claim 11, wherein said output tile comprises (i) a two-dimensional array of output values or (ii) a plurality of two-dimensional arrays of output values arranged in a three-dimensional stack.

14. The method according to claim 11, further comprising the steps of:
    fetching a plurality of additional vectors of said input values from said memory to said second buffer; and
    appending said additional vectors to said block of said input values in said second buffer to feed calculations of a plurality of additional output tiles.

15. The method according to claim 11, further comprising the step of:
    reusing said input values in said third circuit as received in said second signal from said second buffer across adjacent ones of said input tiles.

16. The method according to claim 11, further comprising the step of:
    decimating said input values in said second circuit prior to said transfer in said second signal to said third circuit.

17. The method according to claim 11, further comprising the steps of:
    reading from said second buffer at most said input tiles that correspond to one or more non-zero values of said kernel values in said kernel; and
    transferring in said signal at most said input tiles that correspond to said one or more non-zero values of said kernel values in said kernel.

18. The method according to claim 11, wherein said block fetched from said memory to said second buffer by said second circuit has at most said input tiles that correspond to one or more non-zero values of said kernel values in said kernel.

19. The method according to claim 11, wherein said input tiles in said block as stored in said memory are decimated prior to transferring from said memory to said second circuit.

20. The method according to claim 11, wherein said steps are performed in a computer vision system.

* * * * *